(12) United States Patent
Fujieda

(10) Patent No.: US 6,885,439 B2
(45) Date of Patent: Apr. 26, 2005

(54) FINGERPRINT INPUT DEVICES AND ELECTRONIC DEVICES PROVIDED WITH THE SAME

(75) Inventor: Ichiro Fujieda, Tokyo (JP)

(73) Assignee: NEC Corporation (JP)

( * ) Notice: Subject to any disclaimer, the term of this patent is extended or adjusted under 35 U.S.C. 154(b) by 11 days.

(21) Appl. No.: 10/288,925

(22) Filed: Nov. 6, 2002

(65) Prior Publication Data

US 2003/0090650 A1 May 15, 2003

(30) Foreign Application Priority Data

Nov. 9, 2001 (JP) ........................................ 2001-344895

(51) Int. Cl.[7] .............................................. G06K 9/74
(52) U.S. Cl. ......................... 356/71; 382/124; 382/116; 358/514
(58) Field of Search .......................... 356/71; 358/514; 382/116, 124

(56) References Cited

U.S. PATENT DOCUMENTS

| | | | | |
|---|---|---|---|---|
| 5,313,941 A | * | 5/1994 | Braig et al. .................... 356/41 |
| 5,426,708 A | | 6/1995 | Hamada et al. ............. 382/125 |
| 5,446,290 A | | 8/1995 | Fujieda et al. .............. 250/556 |
| 5,615,672 A | * | 4/1997 | Braig et al. .................. 600/474 |
| 5,719,950 A | * | 2/1998 | Osten et al. ................ 382/115 |
| 5,732,148 A | * | 3/1998 | Keagy et al. ................. 356/71 |
| 6,055,324 A | | 4/2000 | Fujieda ........................ 382/124 |
| 6,249,618 B1 | | 6/2001 | Hou ............................ 382/312 |
| 6,429,927 B1 | * | 8/2002 | Borza .......................... 356/71 |
| 6,483,931 B2 | * | 11/2002 | Kalnitsky et al. ........... 382/124 |
| 6,537,225 B1 | * | 3/2003 | Mills .......................... 600/481 |
| 2002/0054394 A1 | * | 5/2002 | Sasaki et al. ............... 358/514 |

FOREIGN PATENT DOCUMENTS

WO      WO 00/07139          10/2000   ............ G06K/9/00

* cited by examiner

*Primary Examiner*—Michael P. Stafira
*Assistant Examiner*—Juan D Valentin, II
(74) *Attorney, Agent, or Firm*—Hayes Soloway P.C.

(57) ABSTRACT

To provide a fingerprint input device including a collected fiber member that is brought into intimate contact with a fingerprint surface of a finger, a planar light source for illuminating said fingerprint surface, and a two-dimensional image sensor for detecting a light reflected from the fingerprint surface and a light scattered in the finger and emitted from the fingerprint surface, the two-dimensional image sensor having a plurality of photoelectric conversion element arranged two-dimensionally on a substrate. The fingerprint input device detects a fingerprint image and a plethysmogram or acceleration plethysmogram by switching between a mode, in which electric signals produced in the plurality of photoelectric conversion elements are output simultaneously, and a mode, in which electric signals produced in the plurality of photoelectric conversion elements are output sequentially. Thus, the fingerprint input device having a simple configuration can detect the fingerprint image or the plethysmogram with high precision.

22 Claims, 13 Drawing Sheets

10 : PLANAR LIGHT SOURCE
20 : TWO-DIMENSIONAL IMAGE SENSOR
30 : COLLECTED FIBER MEMBER
40 : HOUSING

10b : LIGHT EMITTER
20b : TWO-DIMENSIONAL IMAGE SENSOR
30b : COLLECTED FIBER MEMBER
40b : HOUSING

10c : EMISSIVE DISPLAY
20c : TWO-DIMENSIONAL IMAGE SENSOR
30c : COLLECTED FIBER MEMBER
40c : HOUSING

10d : EMISSIVE DISPLAY
220 : TWO-DIMENSIONAL IMAGE SENSOR
230 : COLLECTED FIBER MEMBER
120 : LIGHT DETECTOR
40d : HOUSING

10e : EMISSIVE DISPLAY
20e : CAPACITIVE-TYPE FINGERPRINT SENSOR
120 : LIGHT DETECTOR
40e : HOUSING

10f : LIGHT EMITTER
20f : TWO-DIMENSIONAL IMAGE SENSOR
120 : LIGHT DETECTOR
40f : HOUSING
50 : MICROPRISM
60 : LENS

110 : LIGHT EMITTER
120 : LIGHT DETECTOR
130 : HOUSING

210 : PLANAR LIGHT SOURCE
220 : TWO-DIMENSIONAL IMAGE SENSOR
221 : TRANSPARENT SUBSTRATE
222 : SWITCH ELEMENT
223 : PHOTOELECTRIC CONVERSION ELEMENT
224 : WIRING FOR SWITCHING
225 : WIRING FOR SIGNAL READOUT
226 : WIRIN FOR BIASING
227 : OPENING
230 : COLLECTED FIBER MEMBER
231 : CORE

FINGERPRINT INPUT DEVICES AND ELECTRONIC DEVICES PROVIDED WITH THE SAME

BACKGROUND OF THE INVENTION

1. Field of the Invention

The present invention relates to a fingerprint input device. In particular, it relates to a fingerprint input device having a function of detecting a blood pulse and an electronic device provided with the same.

2. Description of the Related Art

Conventionally, diagnostic instruments for blood circulation, which detect a second derivative of a plethysmogram (acceleration plethysmogram) from a tip of a finger for determining a condition of peripheral blood circulation, have been known. For example, Japanese Patent Laid-Open No. 2000-23928 specification discloses one of such diagnostic instruments. FIGS. 9A and 9B show a configuration of a blood pulse detector described in the specification. In FIGS. 9A and 9B, the blood pulse detector comprises a light emitter 110 for irradiating a finger F with a light, a light detector 120 for detecting light scattered at the finger F, and a housing 130 for securely positioning the finger F with respect to these components. In FIG. 9A, the light emitter 110 and the light detector 120 are disposed side by side below the finger F. In FIG. 9B, the light emitter 110 and the light detector 120 are disposed with the finger F interposed therebetween.

Here, operations of the arrangements in FIGS. 9A and 9B will be described. In the arrangement shown in FIG. 9A, the light from the light emitter 110 is scattered or diffused in the finger F, and the scattered or diffused light is detected by the light detector 120. In the arrangement shown in FIG. 9B, the light from the light emitter 110 passes through the finger F and then detected by the light detector 120. For both the arrangements in FIGS. 9A and 9B, the light detector 120 produces output indicating a blood volume in capillaries of the finger F reflected therein. Therefore, the time variation in the output of the light detector 120 can be monitored to determine a plethysmogram, which is a time variation in the blood volume. Besides, as is well known, a condition of blood circulation of a patient can be diagnosed based on an acceleration plethysmogram. The acceleration plethysmogram can be determined by differentiating the plethysmogram two times. Therefore, if the plethysmogram obtained with the arrangement in FIG. 9A or 9B is analyzed with an external computing device, the condition of blood circulation can be diagnosed.

Conventionally, furthermore, slim fingerprint input devices have been known. For example, U.S. Pat. No. 5,446,290 discloses one of such fingerprint input devices. FIG. 10 shows essential components of the device described in the U.S. Pat. No. 5,446,290. The fingerprint input device comprises a stack of a planar light source 210, a two-dimensional image sensor 220 and a collected fiber member 230. The planar light source 210 is a thin light source comprising light-emitting diodes (LED) disposed on an end of a light-guide, which is commonly used as a back light source of a liquid crystal display (LCD).

The two-dimensional image sensor 220 comprises pixels two-dimensionally disposed on one surface of a transparent substrate 221. Each pixel comprises a switch element 222 and a photoelectric conversion element 223, and is connected to a wiring 224 for the switch, a wiring 225 for signal readout and a wiring 226 for biasing. The transparent substrate 221 has an opening 227 provided at a region where these wirings and pixels are not included, and the region can transmit light. The collected fiber member 230 is fabricated in such a manner that a lot of optical fibers are fused together, the fused optical fibers are cut into plates, and then the surfaces of the plate are polished. An incident light passes through cores 231 of the collected fiber member 230, and thus, an image formed on one surface of the member is transmitted to the other surface thereof.

Next, an operation of the fingerprint input device will be described. The light from the planar light source 210 passes through the opening 227 in the two-dimensional image sensor 220 and the cores 231 in the collected fiber member 230 in this order, and is applied to a finger (not shown) that is pressed against an upper surface of the collected fiber member 230. Then, the light reflected and scattered at the finger is incident on the cores 231 of the collected fiber member 230 and then detected by the photoelectric conversion elements 223 of the image sensor 220. Electric signals produced in the photoelectric conversion elements 223 are read out through the wirings 225 for signal readout sequentially under the control of control signals applied to the wirings 224 for switching, and the read-out signals are recorded in an external circuit (not shown), whereby a fingerprint image can be obtained.

The conventional diagnostic instrument for blood circulation shown in FIGS. 9A and 9B does not have the function for inputting a fingerprint image. On the other hand, the conventional fingerprint input device does not have the function to detect a blood pulse. If the two functions, the function to detect a blood pulse and the function to input a fingerprint image, are integrated into one device, such a device would have various applications.

To integrate the two capabilities into one device, it may be readily contemplated that the components of the two kinds of devices are arranged side by side in one housing. However, such an arrangement has the following problems.

First, in order to attain high precision in personal identification, it is essential that a fingerprint image contains a lot of characteristic features (end points or branch points of ridges of a fingerprint), each of which is specific to an individual. For this reason, the collected fiber member needs to be positioned at the center of the finger. On the other hand, in order to detect a blood pulse with sufficient sensitivity, the light detector is desirably disposed where the maximum amount of the light scattered or diffused at the finger is obtained. This indicates that both the collected fiber member and the light detector are to be disposed at the center of the finger, which is physically impossible.

Second, components having similar functions, such as the light emitter and planar light source both capable of emitting light, and the light detector and two-dimensional image sensor both capable of photoelectric conversion, are to be redundantly provided. However, this undesirably leads to an increase in size and manufacturing cost of the device.

In this case, the blood pulses may be detected by the photoelectric conversion element of the two-dimensional image sensor so that the separate light detector can be removed. However, with such an arrangement, the acceleration plethysmogram cannot be obtained with high precision. Specifically, in a typical fingerprint input device, the two-dimensional image sensor includes 500 by 500 pixels, and a readout time per pixel is 100 ns, for example. In this case, the time required for the two-dimensional image sensor to read out one image is 25 ms. That is, a sampling of the actual blood pulse is obtained every 25 ms. This time interval is more than a time constant of the derivations for providing the acceleration plethysmogram (10 ms in the Japanese Patent Laid-Open No. 2000-23928, for example), and thus, the acceleration plethysmogram cannot be obtained with high precision.

SUMMARY OF THE INVENTION

This invention has been devised in view of such circumstances and aims to provide a compact fingerprint input device that has a capability to precisely determine an acceleration plethysmogram based on a quantity of a light scattered by a finger, and an electronic device having the same device mounted thereon.

Specifically, a first object of this invention is to provide two functions of detecting a blood pulse and of inputting a fingerprint image with high precision. A second object of this invention is to decrease the size and the manufacturing cost of the device when the two functions are implemented on single device.

In order to attain the objects, this invention provides a fingerprint input device comprising optical device that is brought into intimate contact with a finger, a light source for illuminating the finger, an image pick-up device for detecting a light reflected from the finger and a light scattered in the finger and emitted from the finger, the image pick-up device including a plurality of photoelectric conversion elements arranged two-dimensionally on a substrate, and mode changing means for switching between a first output mode, in which electric signals produced in the plurality of photoelectric conversion elements are output simultaneously, and a second output mode, in which electric signals produced in the plurality of photoelectric conversion elements are output sequentially. According to this invention, a detecting instrument for detecting a plethysmogram or acceleration plethysmogram from electric signals output in the first output mode is further provided.

In order to attain the objects, this invention provides a fingerprint input device comprising optical device that is brought into intimate contact with a finger, a light source for illuminating the finger in intimate contact with the optical device, a fingerprint sensor for detecting a fingerprint image by detecting a light reflected from the finger and a light scattered in the finger and emitted from the finger, the fingerprint sensor having a transparent part for transmitting light formed at a part thereof, a light detector for detecting a light having transmitted through the fingerprint sensor, the light detector being disposed below the fingerprint sensor, and a detecting instrument for detecting a plethysmogram or acceleration plethysmogram based on an output signal of the light detector.

In order to attain the objects, this invention provides a fingerprint input device comprising a microprism that is brought into intimate contact with a finger and has a plurality of small prisms formed on a surface opposite to the surface to be brought into intimate contact with the finger, a light source for illuminating the finger, an image pick-up device for detecting a fingerprint image by detecting a light having transmitted through the microprism, the image pick-up device being disposed below the microprism, a light detector for detecting the light having transmitted through the microprism, the light detector being disposed below the microprism, and a detecting instrument for detecting a plethysmogram or acceleration plethysmogram based on an output signal of the light detector.

DETAILED DESCRIPTION OF THE PREFERRED EMBODIMENTS

Now, embodiments of this invention will be described in detail with reference to the drawings.

First Embodiment

Figure 1:
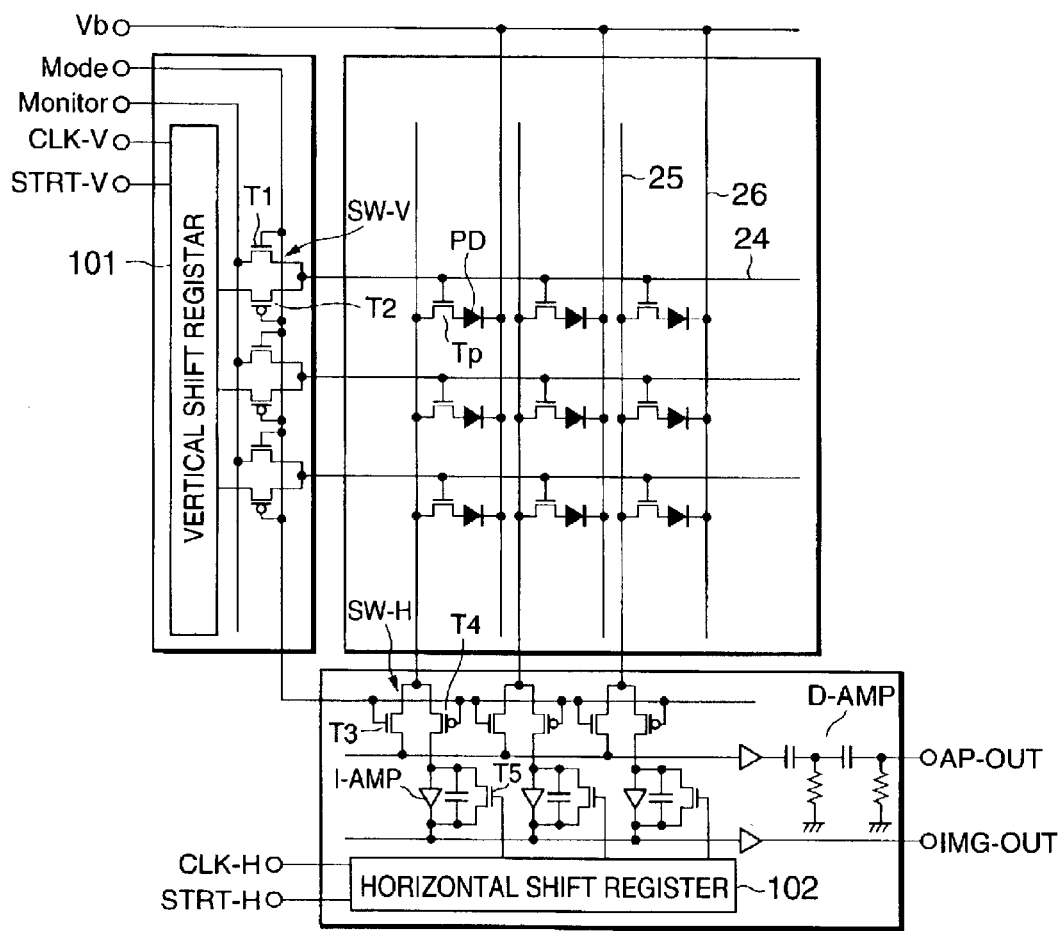
FIG. 1 shows a configuration of a two-dimensional image sensor used in a fingerprint input device according to a first embodiment of this invention.
Figure 2:
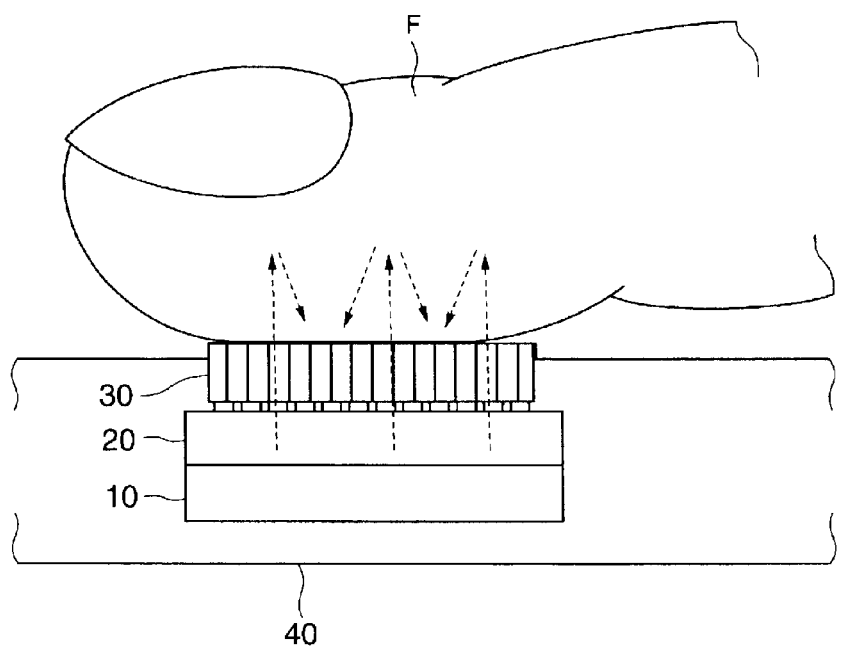
FIG. 2 shows essential components of the fingerprint input device according to the first embodiment of this invention.

FIGS. 1 and 2 illustrate a first embodiment of a fingerprint input device according to this invention. FIG. 1 shows a configuration of a two-dimensional image sensor used in the first embodiment, and FIG. 2 shows essential components of the fingerprint input device according to this embodiment. As shown in FIG. 2, the fingerprint input device according to this embodiment comprises a planar light source 10, a two-dimensional image sensor 20 and a collected fiber member 30, which are stacked on each other and secured in a housing 40 with a surface of the collected fiber member 30 being exposed.

Figure 10:
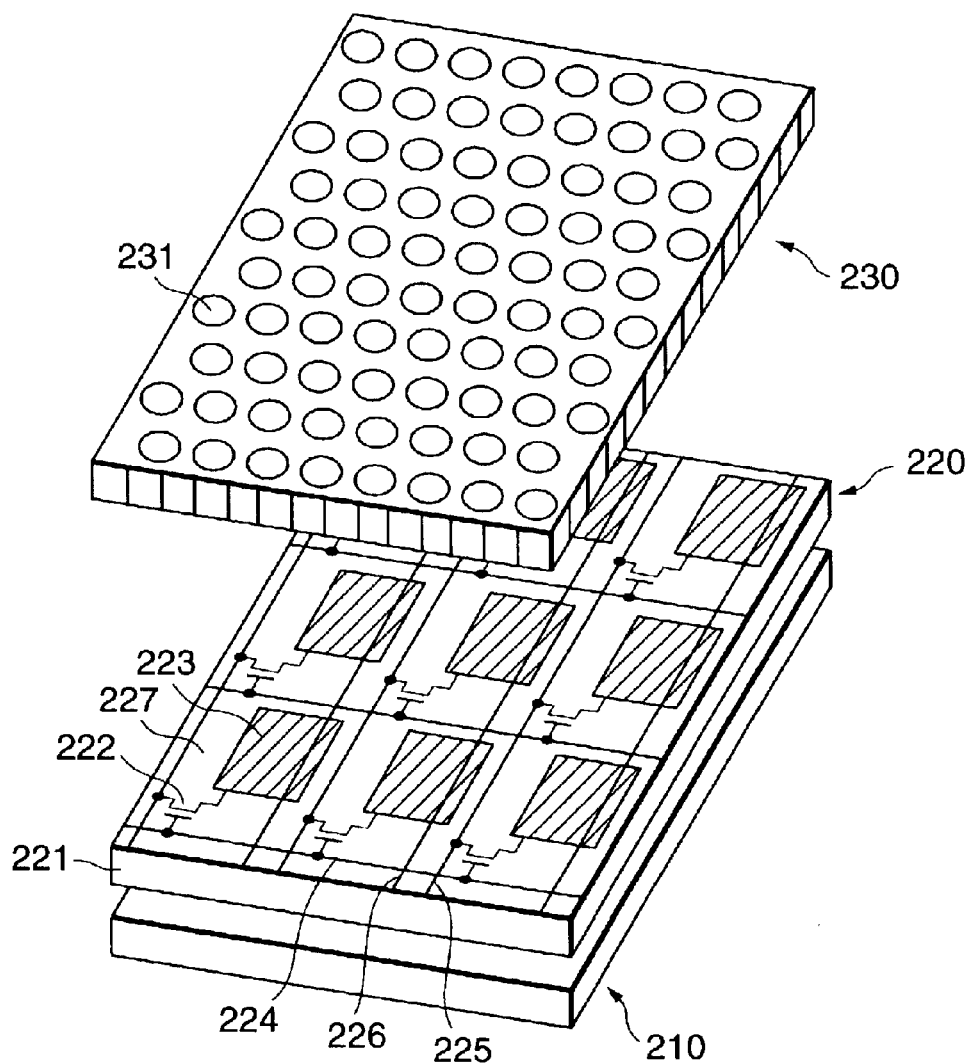
FIG. 10 illustrates a configuration of a conventional thin fingerprint input device.

The fingerprint input device differs from the conventional one shown in FIG. 10 in the circuit configuration of the two-dimensional image sensor 20. The two-dimensional image sensor 20 used in this embodiment will be described in detail with reference to FIG. 1.

As in FIG. 10, the two-dimensional image sensor 20 comprises pixels arranged two-dimensionally, each of the pixels comprising a switch element Tp and a photoelectric conversion element PD. Each pixel is connected to an external driver circuit via three kinds of wirings including a wiring 24 for switching, a wiring 25 for signal readout and a wiring 26 for biasing.

In contrast to the circuit configuration of the conventional two-dimensional image sensor in which the wiring 24 for switching is connected directly to the driver circuit, the wiring 24 for switching is connected to a driver circuit (vertical shift register) 101 via a switch element SW-V, in the configuration shown in FIG. 1. The switch element SW-V is of a two-input one-output type which is composed of a pair of MOS transistors T1 and T2. To an input terminal of the transistor T1, a control signal "Monitor" is externally inputted.

The wiring 25 for signal readout is connected to a driver circuit (represented as I-AMP and horizontal shift register) 102 via a switch element SW-H. The switch element SW-H is of a one-input two-output type which is composed of a pair of MOS transistors T3 and T4. An output terminal of the transistor T4 is connected to a current integrator I-AMP. An output terminal of the transistor T3 is connected to a differential circuit D-AMP. The switch elements SW-V and SW-H are each supplied with a control signal "Mode".

As in the conventional configuration, control signals CLK-V and STRT-V are supplied to the vertical driver circuit (vertical shift register) 101, and control signals CLK-H and STRT-H are supplied to the horizontal driver circuit (horizontal shift register) 102. The CLK-V (CLK-H) is a clock signal required for operation of the shift register circuit in the driver circuit, and the STRT-V (STRT-H) is a control signal for activating the shift register circuit.

While only nine pixels are shown in FIG. 1 for simplicity, pixels (500 by 500 pixels, for example) required to input a fingerprint image should be actually arranged in a matrix across the pixel region of the two-dimensional image sensor. The switch elements SW-V or SW-H may be provided for each of the wirings 24 for switching or wirings 25 for signal readout, respectively, or may be provided only in a part to be pressed against the center of the finger.

The components of the circuit shown in FIG. 1 may be formed on a transparent substrate, such as a glass plate, by a thin film semiconductor technology. It is particularly desirable that whole of the circuit shown in FIG. 1 is formed on a transparent substrate using thin film transistors made of polycrystalline silicon (Poly-Si TFT). The circuit wholly formed on the transparent substrate would have a reduced number of connections, and thus, would improve reliability. The number of external circuits is reduced, resulting in lower manufacturing cost. Of course, it may be contemplated that only pixels in the circuit are formed on a transparent substrate using amorphous silicon technology, the remainder of the circuit is formed of crystalline silicon integrated circuits (IC), and the ICs are mounted on the transparent substrate. The light detector may be a photoelectric conversion element or photo-conduction element formed by a hydrogenated amorphous silicon technology or organic thin film semiconductor technology.

The planar light source 10 has a thickness of about 1 to 2 mm, the two-dimensional image sensor 20 and the collected fiber member 30 each have a thickness of about 0.5 to 1 mm, and the total thickness is 2 to 4 mm. Such compactness allows the fingerprint input device according to this invention to be readily mounted on electronic devices including notebook PCs, cellular phones and other portable devices.

Figure 11:
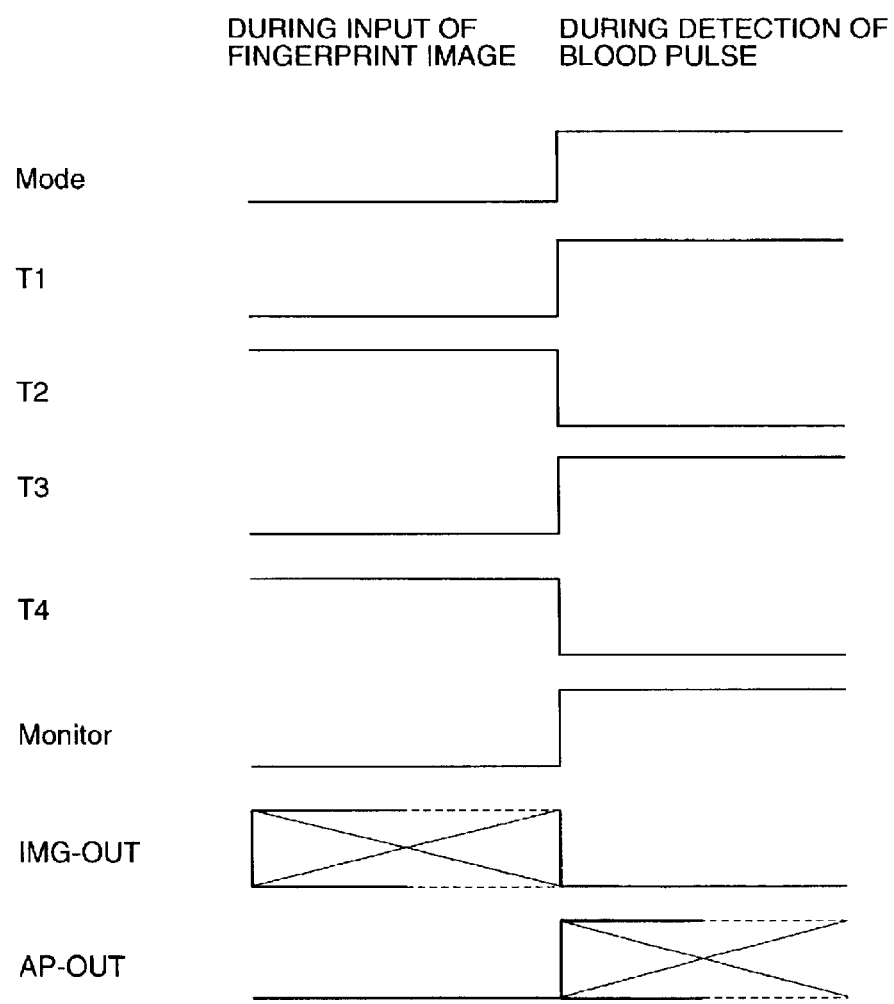
FIG. 11 is a timing chart for illustrating an operation of the fingerprint input device according to the first embodiment of this invention.

Now, while referring to FIGS. 1 and 2, an operation of the fingerprint input device according to this embodiment will be described based on the timing chart in FIG. 11. First, an operation of inputting a fingerprint image will be described. When inputting the fingerprint image, the control signal "Mode" in FIG. 1 is set at a low level (an L level), and the wiring 24 for switching and the wiring 25 for signal readout are electrically connected to their respective driver circuits 101 and 102.

That is, the transistor T2, which is one of the pair of MOS transistors T1 and T2 in the switch element SW-V, is turned on to electrically connect the wiring 24 for switching to the vertical driver circuit (vertical shift register) 101. And, the transistor T4, which is one of a pair of MOS transistors T3 and T4 in the switch element SW-H, is turned on to electrically connect the wiring 25 for signal readout to the current integrator I-AMP.

Then, when the control signals CLK-V and STRT-V are supplied to the vertical driver circuit (vertical shift register) 101 and the control signals CLK-H and STRT-H are supplied to the horizontal driver circuit (horizontal shift register) 102, the two-dimensional image sensor 20 starts to operate the same as the conventional two-dimensional image sensor. In brief, a high level (an H level) driving signal is supplied to a first line of the wirings 24 for switching from the vertical driver circuit 101, whereby all the transistors Tp connected to the first line of the wirings 24 for switching are turned on.

Then, the horizontal driver circuit 102 supplies a driving signal to the MOS transistors T5 each constituting one current integrator I-AMP sequentially from the left to the right in this drawing, and the signals accumulated in the photoelectric conversion elements PD in the first line are sequentially output (IMG-OUT). For a second and the following lines, the signals in the photoelectric conversion elements PD are outputted in the same manner. Then, the fingerprint image is obtained based on these read-out signals. Here, the finger F is illuminated with the light from the planar light source 10, and the fingerprint image is obtained by the two-dimensional image sensor 20 sensing the light reflected from the finger F or emitted from the surface of the finger F after being scattered in the finger as described above.

Next, an operation of detecting a blood pulse will be described. When detecting a blood pulse, the control signal "Mode" is set at an H level, and the wiring 24 for switching and the wiring 25 for signal readout are electrically connected to the control signal "Monitor" and the differential circuit D-AMP, respectively. That is, the transistor T1, which is the other of the pair of MOS transistors T1 and T2 in the switch element SW-V, is turned on to electrically connect the wiring 24 for switching to the control signal "Monitor". And, the transistor T3, which is the other of the pair of MOS transistors T3 and T4 in the switch element SW-H, is turned on to electrically connect the wiring 25 for signal readout to the differential circuit D-AMP.

In this state, if the control signal "Monitor" is set at the H level, the H level signal is supplied to the wirings 24 for switching. Thus, all the switch elements Tp are turned on, and the photoelectric conversion elements PD of all the pixels selected by the wirings 24 for switching are connected to the differential circuit D-AMP in parallel. In this mode, the control signals CLK-V, STRT-V, CLK-H and STRT-H are not supplied.

In this state, the two-dimensional image sensor 20 is equivalent to an arrangement in which one large-area photoelectric conversion element is connected to the differential circuit. Therefore, as in the conventional light detector, the blood pulses can be detected continuously. In addition, the acceleration plethysmogram can be determined with high precision by differentiating the continuously obtained blood pulse signals twice by the differential circuit D-AMP.

As described above, according to this embodiment, the two functions to detect a blood pulse and to input a fingerprint image can be realized with high precision based on the information derived from the center part of the finger. That is, compared with the arrangement in which the respective components for the two functions are arranged side by side, this embodiment is advantageous in that the fingerprint can be imaged from the center of the finger including a lot of characteristic features, and the blood pulse can be detected with high sensitivity from the center of the finger. Furthermore, since the two-dimensional image sensor 20 can serve as one large-area photoelectric conversion element to detect the blood pulses continuously, the acceleration plethysmogram can be obtained with high precision.

In addition, according to this embodiment, the planar light source and the two-dimensional image sensor serve also as the component for emitting light and the component for photoelectric conversion, which are required to provide the two functions. An increase in size and manufacturing cost of the fingerprint input device can be avoided. This is significantly advantageous when the device is to be mounted on a portable device, such as a cellular phone.

Second Embodiment

Figure 3:
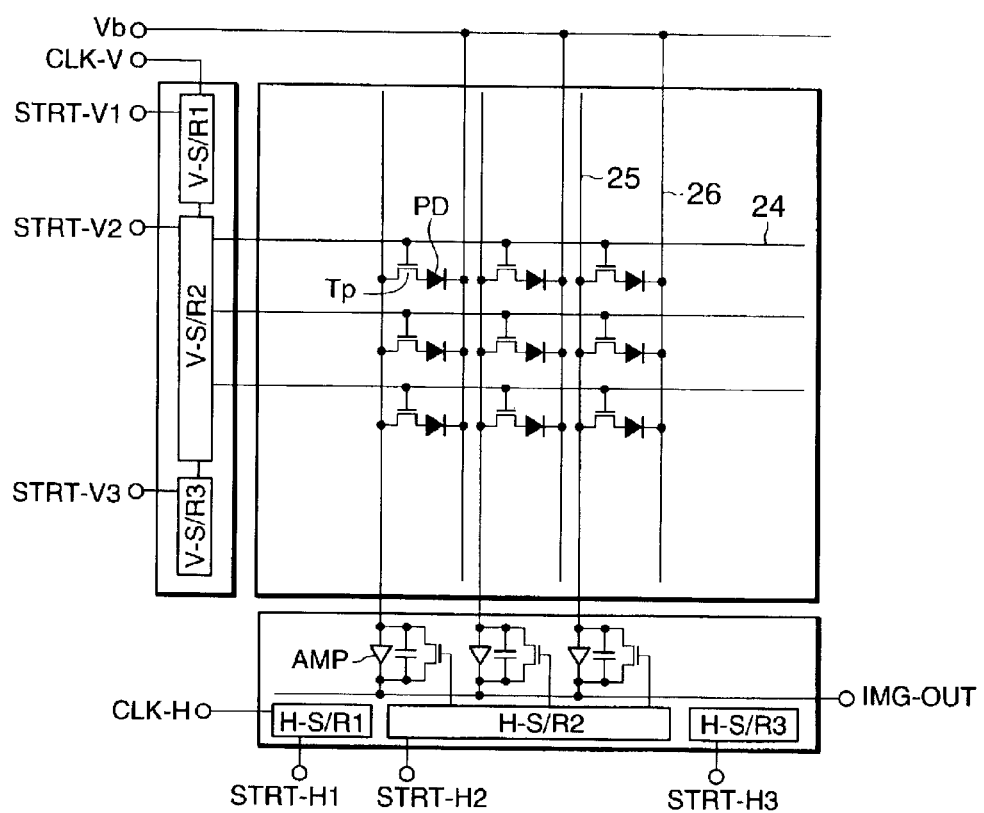
FIG. 3 illustrates another example of the two-dimensional image sensor.

While the two-dimensional image sensor 20 as shown in FIG. 1 has been described in the first embodiment, the two-dimensional image sensor is not limited to this arrangement. For example, it may be arranged as shown in FIG. 3. In FIG. 3, each of the vertical driver circuit and the horizontal driver circuit is separated into three shift registers, and a control signal for activating a shift register is supplied to each of the shift registers separately.

Specifically, the vertical driver circuit 101 is separated into three shift registers V-S/R1, V-S/R2 and V-S/R3, and activation signals STRT-V1, STRT-V2 and STRT-V3 are supplied to the shift registers V-S/R1, V-S/R2 and V-S/R3, respectively. Similarly, the horizontal driver circuit 102 is separated into three shift registers H-S/R1, H-S/R2 and H-S/R3, and activation signals STRT-H1, STRT-H2 and STRT-H3 are supplied to the shift registers H-S/R1, H-S/R2 and H-S/R3, respectively.

An operation of the fingerprint input device will be described. When inputting the fingerprint image, the separated shift register circuits operate as a single independent shift register circuit. For example, this can be realized in such a manner that the control signal STRT-V2 is supplied to the second vertical shift register V-S/R2 to activate the shift register at the time when output of the last stage of the first vertical shift register V-S/R1 is completed, and the control signal STRT-V3 is supplied to the third vertical shift register V-S/R3 to activate the shift register at the time when output of the last stage of the second vertical shift register V-S/R2 is completed. The same holds true for the horizontal driver circuit. The specific operation of inputting a fingerprint image is the same as in the case shown in FIG. 1.

When detecting a blood pulse, the control signals STRT-V2 and STRT-H2 are supplied to the second vertical sift register V-S/R2 and the second horizontal shift register H-S/R2, respectively, to activate only the shift registers V-S/R2 and H-S/R2. In this way, an image of the center of the finger is read out at a high rate. For example, if a pixel pitch is 50 $\mu$m, a 1 mm square region includes 20 by 20 pixels, and therefore, assuming that an output time per pixel is 100 ns, the time required to read out an image of this 1 mm square region at the center of the finger is 40 $\mu$s. The time period of 40 $\mu$s is adequately shorter than 25 ms, which is required in the conventional case of 500 by 500 pixels. That is, the light scattered from the finger, in which the blood pulses are reflected, can be monitored at adequately short intervals, and thus, the acceleration plethysmogram can be obtained based on the detected signals.

When detecting a blood pulse, the photoelectric conversion element accumulates charges in a shorter time than when inputting a fingerprint image. However, there would be no problem if the amount of light of the planar light source 10 is increased or the gain of the amplifier circuits AMP connected to the wirings 25 for signal readout is increased. In this way, the circuit arrangement shown in FIG. 3 can provide the same effect as that shown in FIG. 1. Therefore, this arrangement is also included in the scope of this invention.

Figure 4:
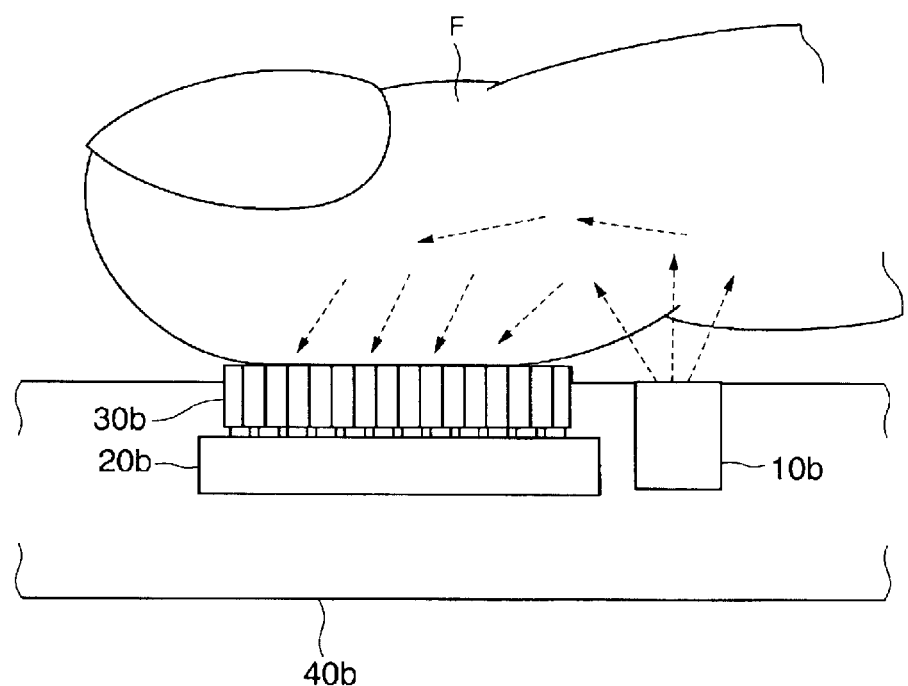
FIG. 4 illustrates a second embodiment of the fingerprint input device according to this invention.
Figure 5:
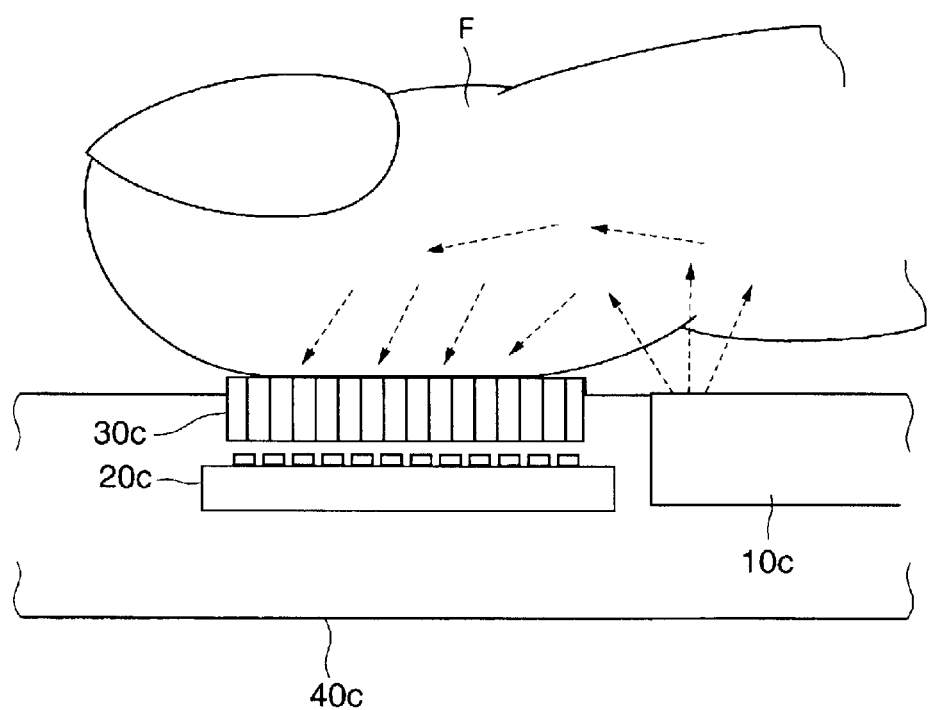
FIG. 5 illustrates the second embodiment of the fingerprint input device according to this invention.

Furthermore, while the finger is illuminated with the light that is emitted from the planar light source and passes through the two-dimensional image sensor in the first embodiment, the method of illuminating the finger is not limited to this manner, and various methods are possible. FIGS. 4 and 5 illustrate other embodiments of the method of illuminating the finger.

According to the embodiment shown in FIG. 4, a stack of a two-dimensional sensor 20b and a collected fiber member 30b and a light emitter 10b are arranged in a housing 40b in such a manner that the finger F can be pressed against them. This arrangements is characterized in that, instead of the planar light source 10 disposed on the back of the two-dimensional image sensor in FIG. 2, the light emitter 10b disposed at the side of the collected fiber member 30b is used to illuminate the finger F.

In detecting a fingerprint image or a blood pulse, the light emitted from the light emitter 10b enters the finger F, and the light scattered in the finger is detected by the two-dimensional image sensor 20b. In this embodiment the two-dimensional image sensor 20b may have the circuit arrangement shown in FIG. 1 or 3. In this case the substrate of the two-dimensional image sensor is not necessarily transparent. Therefore, a CMOS sensor formed on a Si wafer by a CMOS process can be used.

On the other hand, the embodiment shown in FIG. 5 is an arrangement that can be suitably mounted on an electronic device having an emissive display (for example, a transmission-type liquid crystal display with back lights), such as a notebook PC and a cellular phone. This arrangement is characterized in that, instead of the light emitter 10a in FIG. 4, the finger F is illuminated by an emissive display 10c incorporated in the electronic device. This arrangement imposes a restriction on the design of the device in that the fingerprint input device needs to be disposed near to the emissive display. However, no separate light emitter is needed, and therefore, the number of components and the size of the device are advantageously reduced. The operation thereof is identical to FIG. 4. Again, the substrate of the two-dimensional image sensor 20c need not be transparent, and the CMOS sensor formed on a Si wafer can be used.

As described above, the two-dimensional image sensor of FIG. 3 and the arrangement of it in FIG. 4 and FIG. 5 as well can provide the same effect of the first embodiment. That is, the single device has both functions to input a fingerprint image and to detect a blood pulse, and since the signals for both functions are obtained from the same region of the center of the finger, fingerprint identification can be accomplished with high precision. Furthermore, the blood pulses can be detected with high sensitivity and the acceleration plethysmogram can be obtained with high precision. In addition, an increase in size and manufacturing cost of the device can be avoided. Therefore, these arrangements also are included in the scope of this invention.

Alternatively, the collected fiber member in the arrangements described above may be removed, and the finger may be directly pressed against the two-dimensional image sensor having a protective layer formed on a surface thereof. There as on for this is as follows: the collected fiber member has the functions of transmitting image information obtained on one surface thereof to the other surface and of protecting the surface of the two-dimensional image sensor from being damaged; and these functions can be provided to some extent without the collected fiber member if a thin protective layer of SiN, SiON or the like is formed on the surface of the two-dimensional image sensor.

The required level of protection varies with the usage situation or design of the electronic device for which the fingerprint input device is applied. For example, if the electronic device is always carried about outdoors, it requires a high level of protection. However, if a protective cover can be attached to a part of the housing of the electronic device, the level of protection required by the fingerprint input device itself can be low. Therefore, in the case where the level of protection can be low or a protective cover can be attached, the collected fiber member can be removed and the finger can be directly pressed against the protective layer formed on the surface of the two-dimensional image sensor.

A technique of forming such a protective layer is commonly used in a capacitive-type fingerprint input device. For example, U.S. Pat. No. 6,055,324 discloses a capacitive-type fingerprint input device. Here, a capacitance is formed between a finger and each of a large number of microelectrodes with a protective layer and an air layer interposed therebetween. Each of such capacitances is charged and discharged, thereby obtaining a capacitance distribution, which is a piece of information about ridges and recesses on the surface of the finger, that is, the fingerprint.

In order to input a fingerprint image with high precision, it is desirable that the capacitance is large, and to this end, the protective layer is required to have a thickness of about 1 μm or less. For optical fingerprint input devices, the restriction on the thickness of the protective layer is relatively relaxed, and a thickness approaching the pitch of the arranged photoelectric conversion elements is permitted. Thus, the protective layer for the optical fingerprint input device can be formed more easily than for the capacitive-type fingerprint input device.

While the simplest form for the pixel part of the two-dimensional image sensor has been described, a circuit arrangement for the pixel part is not limited to one described above, namely each pixel comprises the switch element Tp and a photoelectric conversion element PD. In particular, an amplifier may be included in each pixel so that a charge produced by the photoelectric conversion element is amplified at a pixel level, thereby reducing relative significance-of a noise component to be superimposed later on.

An image pick-up device having such a pixel part is referred to as "an active pixel sensor", and in particular, it is commonly used in a CMOS sensor formed on a Si wafer by a CMOS process. An image pick-up device formed on a transparent substrate by a thin film semiconductor technology based on the same technical concept as the active pixel sensor has been reported in "Self-referenced poly-Si TFT amplifier readout for a linear image sensor" by I. Fujieda et al, (IEDM Tech. Digest PP. 587–590, 1993).

In this way, without departing from the spirit of this invention, selections among from or replacements with various components are possible. Therefore, the arrangements are included in the scope of this invention.

Third Embodiment

In the first embodiment, the objects of this invention is attained in such a manner that the photoelectric conversion element in the two-dimensional image sensor used for inputting a fingerprint image is used also for detecting a blood pulse. Here, if it is decided that the first object of this invention, that is, provision of two functions of detecting a blood pulse and of inputting a fingerprint image with high precision based on information derived from a center of a finger, is given a higher priority and the second object thereof, that is, reduction of the number of components and the size of the device, is compromised to some extent, various arrangements other than those described above are possible. Thus, in a third embodiment, one light source for illuminating the finger is used both for detecting a fingerprint image and detecting a blood pulse, and dedicated detector are provided separately for detecting a fingerprint image and detecting a blood pulse.

Figure 6:
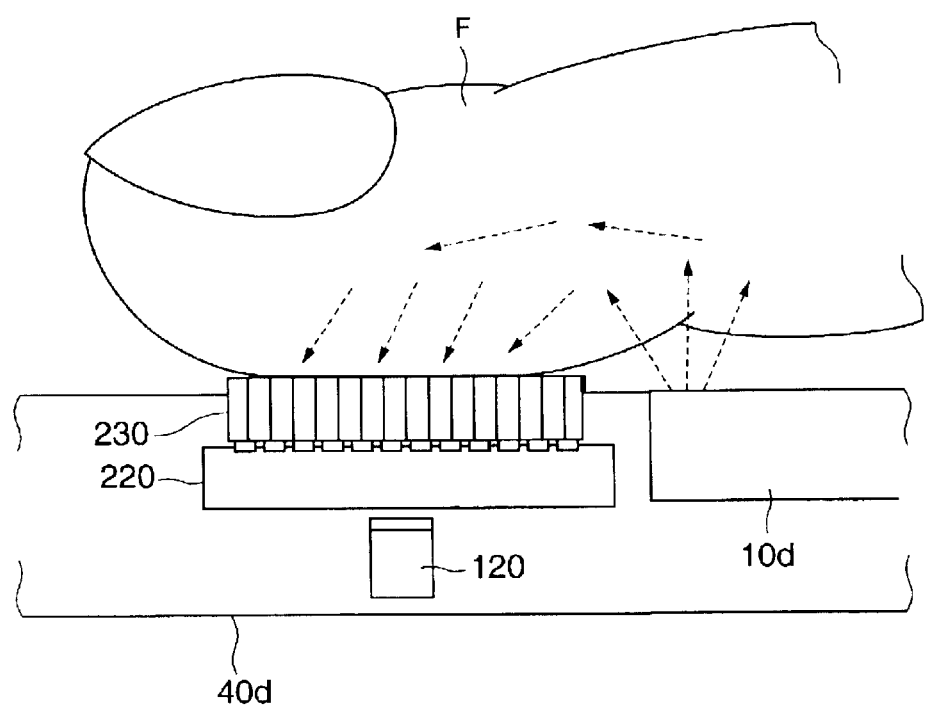
FIG. 6 illustrates a third embodiment of the fingerprint input device according to this invention.
Figure 7:
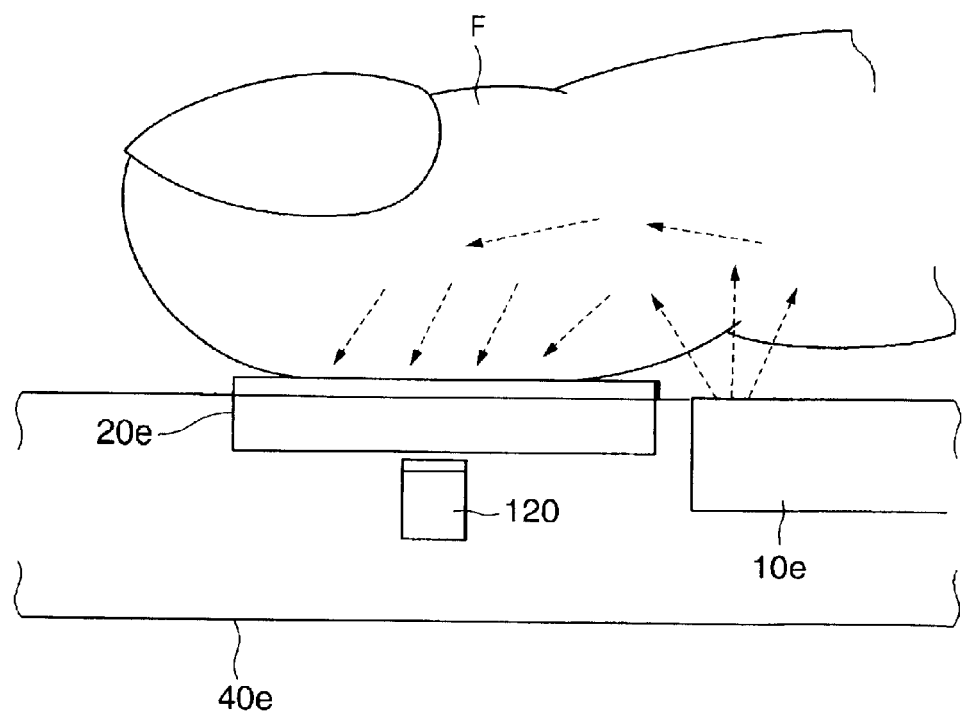
FIG. 7 illustrates the third embodiment of the fingerprint input device according to this invention.
Figure 8:
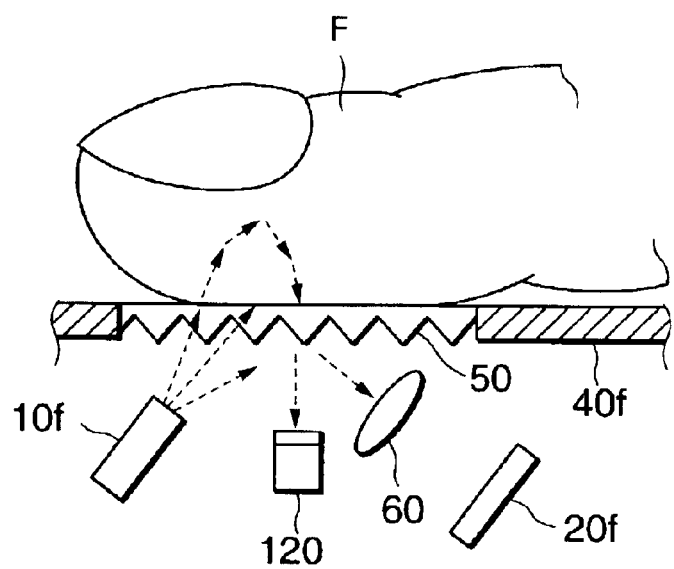
FIG. 8 illustrates the third embodiment of the fingerprint input device according to this invention.
Figure 9A:
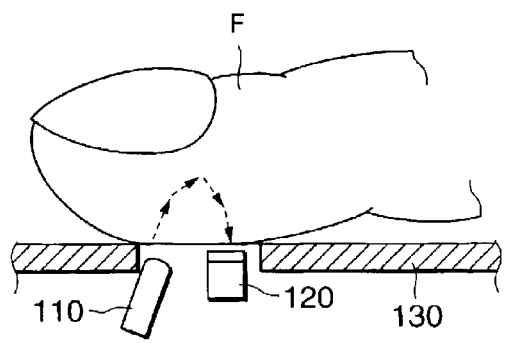
FIG. 9A illustrates a configuration of a pulse detector in a conventional diagnostic instrument for blood circulation.
Figure 9B:
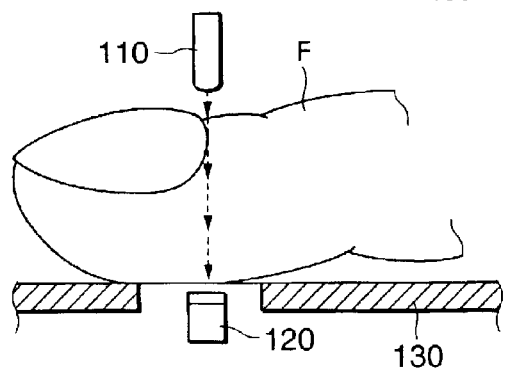
FIG. 9B illustrates another configuration of the pulse detector in the conventional diagnostic instrument for blood circulation.

Among various arrangements according to the third embodiment, three representative examples are shown in FIGS. 6, 7 and 8. First, in the example shown in FIG. 6, a light detector 120 is disposed below a two-dimensional image sensor 220 formed on a conventional transparent substrate. The light detector 120 has a thickness of about 2 mm, and the total thickness of the two-dimensional image sensor 220 and a collected fiber member 230 is about 3 to 4 mm.

In detecting a blood pulse, the light emitted from an emissive display 10d propagates through the finger F. After being scattered inside the finger F, the light enters the collected fiber member 230, passes through a transparent region of the two-dimensional image sensor 220 and then is detected by the light detector 120. A plethysmogram can be obtained from the continuous output of the light detector 120, and an acceleration plethysmogram can be obtained by differentiating the output of the light detector 120 twice. The emissive display 10d is incorporated in an electronic device, such as a cellular phone, and serves as the light source.

Compared with the first embodiment, the arrangement shown in FIG. 6, in which the dedicated light detector is provided for detecting a blood pulse, is more or less disadvantageous in reducing the size and manufacturing cost of the device. However, it can attain the first object of this invention, that is, provision of two functions of detecting a blood pulse and of inputting a fingerprint image with high precision based on information derived from a center of a finger.

The two-dimensional image sensor used in the arrangement shown in FIG. 6 is used only for inputting a fingerprint image. Therefore, the fingerprint image need not be detected optically, and various types of fingerprint sensors may be used including the capacitive-type described above and a pressure sensitive type in which a pressure difference caused by ridges and recesses of a fingerprint is detected. However, in order for light to reach the light detector 120, the fingerprint sensor is required to transmit at least some of light therethrough.

FIG. 7 shows an example in which a capacitive-type fingerprint sensor formed on a transparent substrate is used. Reference numeral 20e denotes a capacitive-type fingerprint sensor. As the capacitive-type fingerprint sensor, the one described in the U.S. Pat. No. 6,055,324 may be used, for example. Reference numeral 10e denotes an emissive display and reference numeral 120 denotes a light detector. The emissive display 10e, which serves as the light source, is incorporated in an electronic device.

Also in the arrangement shown in FIG. 7, fingerprint recognition and acceleration plethysmogram detection can be accomplished with high precision by using information obtained from the center of the finger. Since the capacitive-type fingerprint sensor 20e has a thickness of about 0.5 to 1 mm, the total thickness of the device including the light detector is about 2.5 to 3.5 mm. In FIGS. 6 and 7, a dedicated light source maybe provided, rather than making use of the light source in the electronic device.

For applications in which the total thickness of about 10 to 20 mm is permitted, the arrangement shown in FIG. 8 can be adopted. The fingerprint input device comprises a light emitter 10f, a lens 60, a two-dimensional image sensor 20f and a light detector 120, which are disposed below a microprism 50 having small prisms formed on one surface thereof. The two-dimensional image sensor 20f may be either the sensor formed by the thin film semiconductor technology described above, the CMOS sensor, or a CCD.

An operation of the fingerprint input device will be described. The light emitted from the light emitter 10f enters the finger F at a region where the microprism 50 and ridges of the finger F are in contact with each other, and the light scattered in the finger F leaks to the outside. The scattered light is detected by the light detector 120, whereby a plethysmogram (acceleration plethysmogram) is obtained. The operation of obtaining the plethysmogram (acceleration plethysmogram) is the same as in the first embodiment. Besides, at the remaining region of the finger F, an air layer is provided between the finger and the microprism 50, and the light emitted from the light emitter 10f is totally reflected from an interface between the upper surface of the microprism 50 and the air layer. The light is focused on the two-dimensional image sensor 20f through the lens 60, whereby a fingerprint image with enhanced contrast is obtained.

Fourth Embodiment

Figure 12:
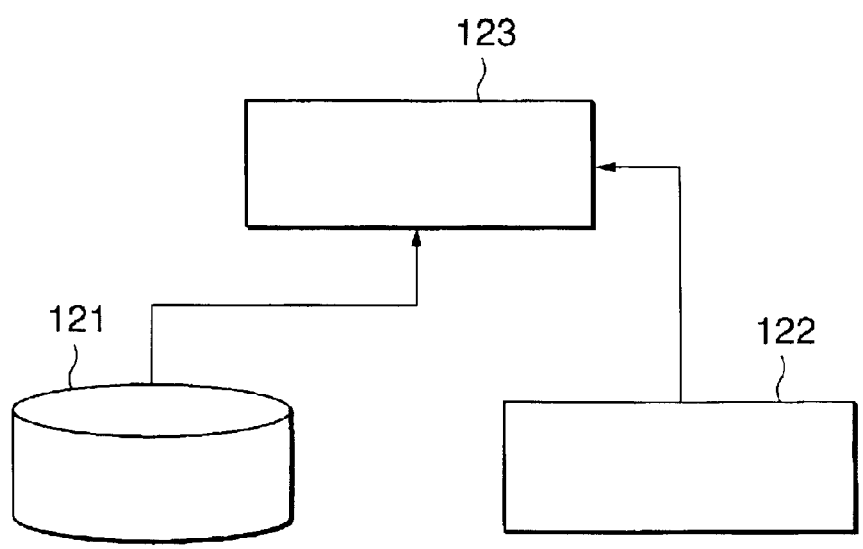
FIG. 12 shows a configuration of an electronic device according to this invention.
Figure 13:
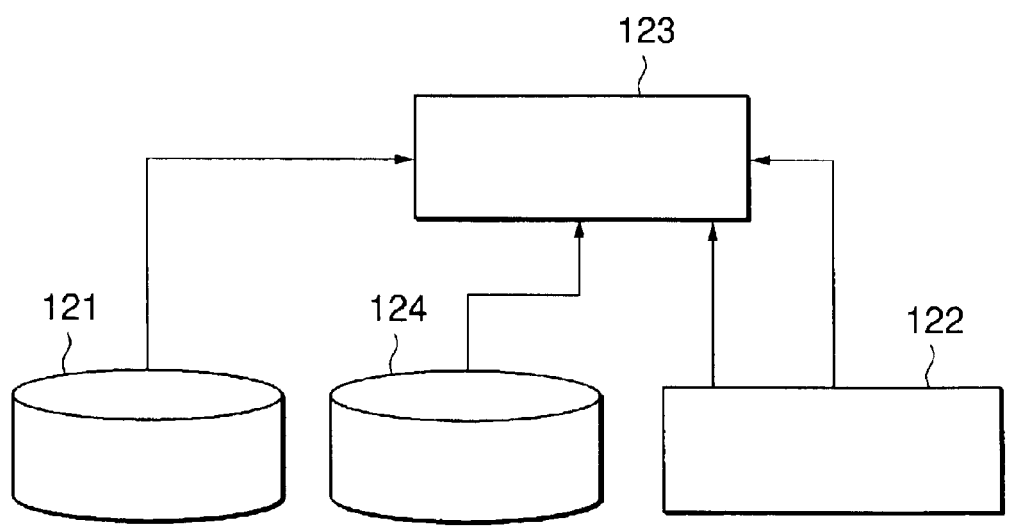
FIG. 13 shows another configuration of the electronic device according to this invention.

Next, an embodiment of an electronic device on which the fingerprint input device having the function to detect a blood pulse according to this invention is mounted will be described with reference to FIGS. 12 and 13. The fingerprint input device according to this invention can be applied for an electronic device including a notebook PC, a cellular phone and other portable devices. Personal identification is accomplished as follows: a fingerprint of an owner of an electronic device is previously registered in a storage device 121; a fingerprint input device 122 reads in a fingerprint; and personal identification unit 123 compares the read-in fingerprint against the fingerprint registered in the storage device. Here, the plethysmogram or acceleration plethysmogram detected by the fingerprint input device 122 may be input to the personal identification unit 123 to determine whether the fingerprint is of a living body or not. The plethysmogram or acceleration plethysmogram may be input to the personal identification unit through a dedicated line, or it may be input to the personal identification unit through the same signal line as the fingerprint data and the fingerprint data and the plethysmogram data or the like may be input by time-sharing.

The personal identification unit 123 can accomplish personal identification based on the plethysmogram or acceleration plethysmogram simultaneously with the personal identification based on the fingerprint. As shown in FIG. 13, during personal identification based on the fingerprint, the fingerprint input device according to this invention is used to detect the plethysmogram or acceleration plethysmogram, and the plethysmogram or acceleration plethysmogram is recorded in a recorder 124. The recording is desirably performed at regular time intervals. The plethysmogram or acceleration plethysmogram is personal information that is not changed in periods ranging from several days to several weeks, and therefore, personal identification can be accomplished by comparing the plethysmogram or acceleration plethysmogram detected by the fingerprint input device 122 against the plethysmogram or acceleration plethysmogram recorded in the recorder 124.

The fingerprint input device according to this invention mounted on an electronic device can provide the following advantages. First, if the personal identification based on the fingerprint is used for logging in to a network, a physical examination based on the plethysmogram or acceleration plethysmogram can be performed simultaneously with the log-in operation. For example, if the plethysmogram or acceleration plethysmogram of a user is measured at the time of logging-in every morning at an office and the result of the physical examination is recorded, the physical condition of the user can be monitored at regular time intervals. This is valuable medical information.

Besides, in applications including various accounting services in which important personal information is accessed via a network, preventing impersonation spoofing using a fake finger is strongly required. According to this invention, the plethysmogram or acceleration plethysmogram can be used to determine whether a finger is of a living body or not, and therefore, misidentification caused by the fake finger can be prevented.

Furthermore, since the plethysmogram or acceleration plethysmogram is personal information that is not changed in periods ranging from several days to several weeks, if the plethysmogram or acceleration plethysmogram is measured at regular time intervals and the measurement result is recorded in a recorder, and the personal identification based on the plethysmogram or acceleration plethysmogram and the personal identification based on the fingerprint image are used in combination, the personal identification can be accomplished with an improved precision compared with the case where only the fingerprint image is used for personal identification.

As described above, according to this invention, the two functions to detect a plethysmogram and to input a fingerprint image can be implemented in a single device, and unlike the arrangement in which the respective components for the two functions are arranged side by side, the fingerprint can be imaged from the center of the finger including a lot of characteristic features and at the same time, the plethysmogram or acceleration plethysmogram can be detected with high sensitivity from the center of the finger. Furthermore, the light source or the image pick up device, which would otherwise be provided for the respective functions, can be integrated, and therefore, an increase in size and manufacturing cost of the device can be suppressed. This is significantly advantageous in incorporating the fingerprint input device according to this invention into a portable device or the like.

With the fingerprint input device according to this invention, the physical examination based on the acceleration plethysmogram can be readily accomplished simultaneously with the personal identification, and the impersonation using a fake finger can be prevented by using the plethysmogram or acceleration plethysmogram to determine whether the finger is of a living body or not. In addition, the personal identification based on the plethysmogram or acceleration plethysmogram and the personal identification based on the fingerprint image can be used in combination to improve the precision of the personal identification.

What is claimed is:

1. A fingerprint input device, comprising:
    an optical device that is brought into intimate contact with a fingerprint surface of a finger;
    a light source for illuminating said fingerprint surface;
    an image pick-up device for detecting a light reflected from said fingerprint surface and a light scattered in the finger and emitted from the fingerprint surface, the image pick-up device including a plurality of photoelectric conversion elements arranged two-dimensionally on a substrate; and mode changer means for switching between a first output mode, in which electric signals produced in said plurality of photoelectric conversion elements are output simultaneously, and a second output mode, in which electric signals produced in said plurality of photoelectric conversion elements are output sequentially.

2. The fingerprint input device according to claim 1, wherein said optical device is a transparent protective layer formed on a surface of said image pick-up device which is brought into intimate contact with the fingerprint surface or a collected fiber member composed of a plurality of optical fibers bound.

3. The fingerprint input device according to claim 1, wherein the substrate of said image pick-up device is made of a transparent material, said light source is constituted by a planar light source, and the planar light source is disposed below said substrate.

4. The fingerprint input device according to claim 1, wherein said light source is disposed at a side of said optical device.

5. An electronic device, comprising:
the fingerprint input device according to claim 1; and
a comparator for accomplishing personal identification based on comparison between a fingerprint image input from said fingerprint input device and a fingerprint image previously registered therewith.

6. The electronic device according to claim 5, further comprising:
a detecting instrument for detecting a plethysmogram or acceleration plethysmogram from electric signals output in said first output mode; and
a recording element for recording the plethysmogram or acceleration plethysmogram input from the detecting instrument for detecting a plethysmogram or acceleration plethysmogram.

7. The electronic device according to claim 5, further comprising:
a detecting instrument for detecting a plethysmogram or acceleration plethysmogram from electric signals output in said first output mode,
wherein living body recognition is accomplished based on the plethysmogram or acceleration plethysmogram input from said detecting instrument for detecting a plethysmogram or acceleration plethysmogram.

8. The electronic device according to claim 5, wherein an emissive display provided in the electronic device serves also as the light source in said fingerprint input device.

9. An electronic device, comprising:
the fingerprint input device according to claim 1;
first personal identification unit for accomplishing personal identification based on comparison between a fingerprint image input in the second mode of said fingerprint input device and a fingerprint image previously registered therewith;
a detecting instrument for detecting a plethysmogram or acceleration plethysmogram from electric signals input in the first mode of said fingerprint input device; and
second personal identification unit for accomplishing personal identification based on comparison between the plethysmogram or acceleration plethysmogram input from said detecting instrument for detecting a plethysmogram or acceleration plethysmogram and the plethysmogram or acceleration plethysmogram previously registered therewith,
wherein said first personal identification unit and said second personal identification unit are used in conjunction with each other for personal identification.

10. The electronic device according to claim 9, wherein an emissive display provided in the electronic device serves also as the light source in said fingerprint input device.

11. The electronic device according to claim 9, wherein said plethysmogram or acceleration plethysmogram is measured and updated at regular time intervals.

12. A fingerprint input device, comprising:
an optical device that is brought into intimate contact with a fingerprint surface of a finger;
a light source for illuminating the fingerprint surface of the finger in intimate contact with said optical device;
a fingerprint sensor for detecting a fingerprint image by detecting a light reflected from said fingerprint surface and a light scattered in the finger and emitted from the fingerprint surface, the fingerprint sensor having a transparent part for transmitting light formed at a part thereof;
a light detector for detecting a light having transmitted through said fingerprint sensor, the light detector being disposed below said fingerprint sensor; and
a detecting instrument for detecting a plethysmogram or acceleration plethysmogram based on an output signal of said light detector.

13. The fingerprint input device according to claim 12, wherein said fingerprint sensor is either an optical image sensor, a capacitive-type fingerprint sensor or a pressure sensitive type fingerprint sensor.

14. An electronic device, comprising:
the fingerprint input device according to claim 12, and
a comparator for accomplishing personal identification based on comparison between a fingerprint image input from said fingerprint input device and a fingerprint image previously registered therewith.

15. The electronic device according to claim 14, further comprising:
a recording element for recording the plethysmogram or acceleration plethysmogram input from said fingerprint input device.

16. The electronic device according to claim 14, wherein living body recognition is accomplished based on the plethysmogram or acceleration plethysmogram input from said fingerprint input device.

17. The electronic device according to claim 14, wherein an emissive display provided in the electronic device serves also as the light source in said fingerprint input device.

18. An electronic device, comprising:
the fingerprint input device according to claim 12,
first personal identification unit for accomplishing personal identification based on comparison between a fingerprint image input from said fingerprint input device and a fingerprint image previously registered therewith; and
second personal identification unit for accomplishing personal identification based on comparison between the plethysmogram or acceleration plethysmogram input from said fingerprint input device and the plethysmogram or acceleration plethysmogram previously registered therewith,
wherein said first personal identification unit and said second personal identification unit are used in conjunction with each other for personal identification.

19. The electronic device according to claim 18, wherein an emissive display provided in the electronic device serves also as the light source in said fingerprint input device.

20. The electronic device according to claim 18, wherein said plethysmogram or acceleration plethysmogram is measured and updated at regular time intervals.

21. A fingerprint input device, comprising:

an optical device that is brought into intimate contact with a fingerprint surface of a finger;

a light source for illuminating said fingerprint surface;

an image pick-up device for detecting a light reflected from said fingerprint surface and a light scattered in the finger and emitted from the fingerprint surface, the image pick-up device including a plurality of photoelectric conversion elements arranged two-dimensionally on a substrate;

a first switch of two-input one-output type that is connected between said plurality of photoelectric conversion elements and a vertical driver circuit;

a second switch of one-input two-output type that is connected between said plurality of photoelectric conversion elements and a horizontal driver circuit;

a mode changer for controlling said first and second switches to switch between a first output mode, in which electric signals produced in said plurality of photoelectric conversion elements are output simultaneously, and a second output mode, in which electric signals produced in said plurality of photoelectric conversion elements are output sequentially;

a current integrator connected to one of outputs of said second switch; and a differential circuit connected to the other of the outputs of said second switch.

22. A fingerprint input device, comprising:

an optical device that is brought into intimate contact with a fingerprint surface of a finger;

a light source for illuminating said fingerprint surface;

an image pick-up device for detecting a light reflected from said fingerprint surface and a light scattered in the finger and emitted from the fingerprint surface, the image pick-up device including a plurality of photoelectric conversion elements arranged two-dimensionally on a substrate;

a plurality of vertical driver circuits that drives said plurality of photoelectric conversion elements sequentially in a vertical direction; and a plurality of horizontal driver circuits that drives said plurality of photoelectric conversion elements sequentially in a horizontal direction;

wherein the vertical driver circuits are separated into at least two vertical driver units and the horizontal driver circuits are separated into at least two horizontal driver units, and wherein predetermined one of the vertical driver units and predetermined one of the horizontal driver units can be activated at the predetermined condition.

* * * * *